United States Patent [19]

Sweet

[11] 4,431,869
[45] Feb. 14, 1984

[54] TELEPHONE LINE FEED

[75] Inventor: Anthony W. Sweet, Saffron Walden, England

[73] Assignee: Standard Telephones and Cables Limited, London, England

[21] Appl. No.: 212,347

[22] Filed: Dec. 3, 1980

[30] Foreign Application Priority Data

Dec. 6, 1979 [GB] United Kingdom ................ 7942104

[51] Int. Cl.³ ........................ H04M 1/00; H04B 3/16
[52] U.S. Cl. .................................... 179/77; 179/16 F
[58] Field of Search ............. 179/18 F, 18 FA, 16 F, 179/81 R, 70, 77, 170 R, 170 G

[56] References Cited

U.S. PATENT DOCUMENTS 4,037,066  7/1977  Kiko ............................. 179/170 G
4,268,723  5/1981  Taylor ............................. 179/16 F

*Primary Examiner*—Thomas A. Robinson
*Attorney, Agent, or Firm*—James B. Raden; Marvin M. Chaban

[57] ABSTRACT

In a telephone line feeding arrangement, the line current is monitored by a multi-resistor network ($R_pR_s$) and the output of the network applied to the inputs of an operational amplifier (A3). The output of this amplifier, which is a voltage whose value depends on the line current, is compared by a comparator (A4) with a reference voltage ($V_R$) to produce a control voltage for a variable voltage (VVS), the output of which provides line feeding voltage.

In an alternative, the monitoring is effected by connecting the two line wires each via a resistor to one of the inputs of an operational amplifier (A6) whose output is a voltage dependent on line voltage. This voltage is applied to an input of another operational amplifier (A7) where it is in effect added to a reference voltage ($V_R$). The output of this amplifier (A7) is used to control the variable voltage source (VVS), which in turn controls a constant current source (CCS) whose output provides line current.

10 Claims, 8 Drawing Figures

TELEPHONE LINE FEED

This invention relates to a line feeding arrangement for a telephone subscriber's line.

The conventional arrangement for feeding power to a telephone line is shown in FIG. 1: it has a line transformer for the speech, with a power feed from the exchange's −48 v battery via an on-hook-off-hook sensing element shown in the dotted line box. This, which is usually a relay, has an effective DC resistance of 200 ohms in both the earth and the battery loop. A disadvantage of this is that on short lines a relatively high current is fed to line, so dissipation in the sending element may be excessive. Also in fault condition, e.g. earth or short circuit on line, the dissipation may be significantly higher than normal.

Feeding arrangements of the constant current type have been tried, e.g. as in FIG. 2, where a constant current source CCS supplies a constant direct current to the line irrespective of length. This usually uses transistor circuitry, and although better than the FIG. 1 arrangement from the dissipation aspect, dissipation on short lines and under short circuit faults is still significant. This is because in such cases most of the exchange battery voltage is dropped across this circuit, resulting in relatively high dissipation in the control transistor(s).

An object of the invention is to provide a line feeding arrangement in which dissipation due, inter alia, to short lines and faults, is minimised as compared with the known circuits.

According to the invention there is provided a line feeding arrangement for a telephone subscriber's line, which includes a variable voltage source connected to the line for supplying power thereto, a monitoring circuit connected to the line for monitoring the voltage across the line or the current flowing in the line, said monitoring means producing an output voltage whose value varies with said line current or voltage, comparison means to which the output from the monitoring circuit is applied so that the output is compared with a reference voltage, and connections from the output of the comparison means to the voltage source so that the voltage applied therefrom to the line is adjusted in accordance with line conditions as represented by the monitored line current or voltage.

Embodiments of the invention will now be described with reference to the accompanying drawings, in which.

Figure 3:
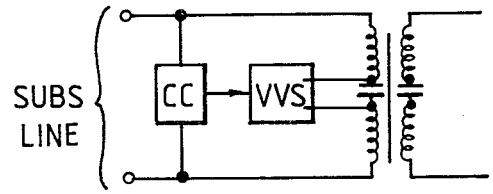
FIG. 3 is a simplified block diagram of a first embodiment of the invention.
Figure 4:
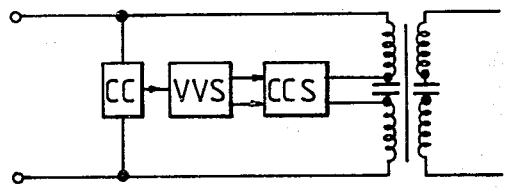
FIG. 4 is a simplified block diagram of a second embodiment of the invention.

FIGS. 3 and 4 indicate the principle on which the invention is based, which is the use of a variable voltage source VVS in place of the fixed 48 volt exchange battery, and which is so controlled that only enough voltage is generated to feed power to the line loop connected to the circuit at any given instant. The line is monitored by control circuitry CC, the output of CC controlling the output of the variable source VVS. In FIG. 3 the feeding algorithm is such that the line appears to be connected to a 50 volt 200+200 ohms feed, while in FIG. 4 the control algorithm is such that only enough voltage is produced to maintain the constant current source CCS in its active working mode. Thus on a very short line, or zero loop, only sufficient voltage is generated to keep the constant current control transistor in an active mode of operation.

Figure 1:
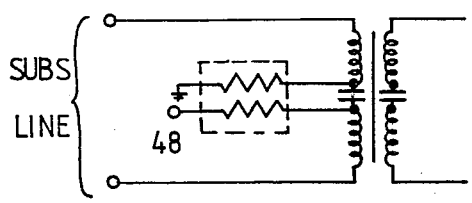
Figure 2:
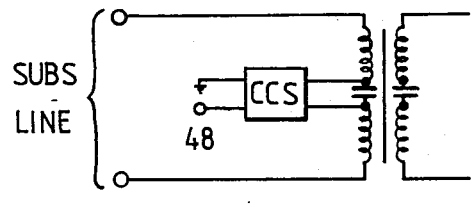

In the arrangement of FIG. 3, assuming that the source VVS is 70% efficient it is found that the current fed to the line is the same as for FIG. 1, i.e. some 125 mA into a zero subscriber loop, tailing off to about 20 mA into a 2000 ohm loop. However, the total power consumed and the power dissipated in the feeding arrangement is substantially less than for FIG. 1, especially for lower resistance loops. Advantages of FIG. 3 are that much less power is consumed where most subscriber loops are 800 ohms or less, that dissipation in the feed is low, never more than half a watt, and that dissipation in the feed remains low when there is an earth or short circuit fault on the line.

In the constant current arrangements it is assumed that the constant current circuit feeds 32 mA to line. A disadvantage of a fixed constant current line feed from the exchange battery is that it only operates satisfactorily over a limited range of loop resistance, which is reached at 1500 ohms with 32 mA and a 45 volt battery. At this point the constant current control transistor saturates, and the feed degenerates to a constant voltage type. By contrast, the arrangement of FIG. 4 can be designed to deliver the constant line current over a greater range of loop resistance because the source VVS can be designed to have an output voltage higher than the 48 volt exchange battery. Again dissipation of the circuitry is significantly less than the simple constant current feed for short loops, so substantial savings occur where the majority of lines are 1000 ohms or less.

Figure 5:
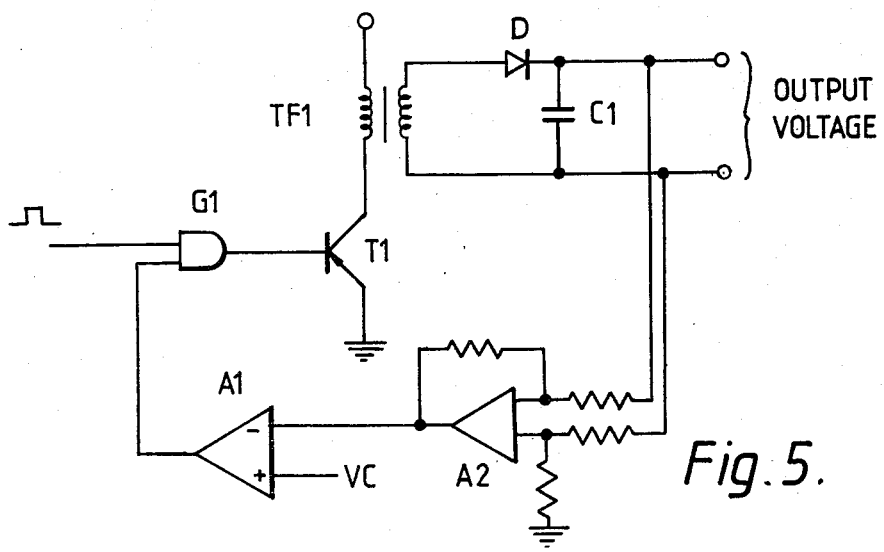
FIGS. 5 and 6 show two circuits for controlling a variable voltage source, usable in the circuits of FIGS. 3 and 4.

FIG. 5 shows one form of variable voltage source usable in the arrangements of FIGS. 3 and 4. It includes a pulse supply via a transistor T1 and transformer TF1 to a diode D, which passes the pulses into a storage capacitor C1. Thus the circuit is, in effect, an elementary form of DC-DC converter, in which the transistor switch allows energy to be stored in the inductance of TF1 when the switch is closed. When the switch is open, the energy thus stored is transferred via the diode D into C1, the output voltage being taken from across C1.

The output voltage of such a converter is dependent on the width of the pulse applied to T1, the pulse frequency, and the value of the load across the output. Thus either the frequency or the width of the pulses may be varied.

In FIG. 5 we have a feedback loop in which the output voltage across the capacitor C1 is compared with a control voltage $V_c$ by a comparator A1. This comparator A1, which is an operational amplifier, is fed from the output voltage via another operational amplifier A2, and its output controls an AND gate G1 which feeds the base of T1.

If the output voltage exceeds that of the control voltage, the comparator A1 causes the pulse feed to T1 to be cut off, while if the output voltage is lower than the control voltage, the pulse supply is reconnected to the transistor T1.

Figure 6:
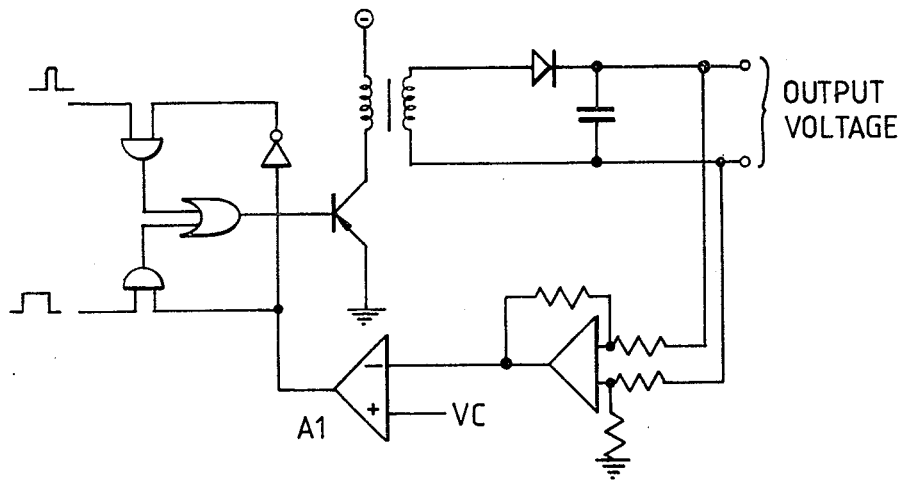

A similar principle is used in the circuit of FIG. 6, where a change over is made between a narrow pulse and a wide pulse, depending on the result of the comparison by the comparator A1 of the output voltage and the control $V_c$. Thus both in FIGS. 5 and 6 a negative feed back loop is set up so that the output voltage is rapidly set to whatever voltage $V_c$ is applied to the input to the comparator. These circuits are physically small and operate at relatively high frequencies, e.g. hundreds of KHz to the MHz range. Note that in some cases it may be desired to control both the frequency and the width of the pulses fed to the base of T1.

Figure 7:
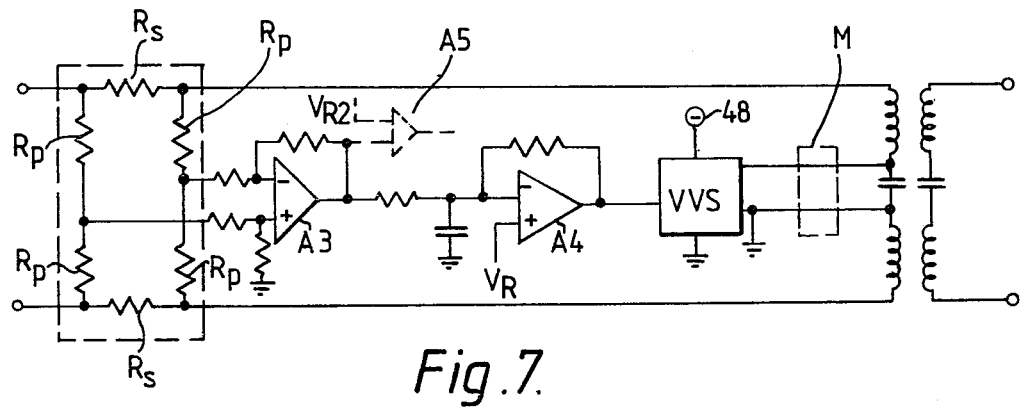
FIG. 7 is a low dissipation line feeding arrangement embodying the invention.
Figure 8:
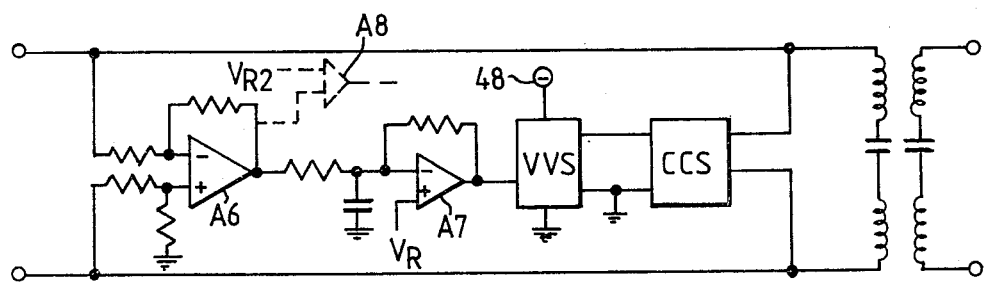
FIG. 8 is a low dissipation line feeding arrangement embodying the invention, in which constant current feed is used.

As will be seen later, the control voltage for the variable voltage source is varied in accordance with line conditions. In the next two circuits to be described we show the complete circuits of the two variants. FIG. 7 is where the line feed has to be the equivalent of the conventional 200+200 ohm 50 volt feeding arrangement, while FIG. 8 is for the case where constant current line feed is required. In both cases a variable voltage source such as that of FIG. 5 or 6 is used, the additional circuitry in FIGS. 7 and 8 being required to monitor the line, and to produce the control voltage for the voltage source.

In the circuit of FIG. 7, a multi-resistor monitor circuit is used, in which the series resistors $R_S$ are of 10 ohms, and so introduce very little dissipation, while the parallel resistors $R_P$ are of 20K ohms, so that they cause very little shunt loss. The voltage supplied from this monitor circuit, which is proportional to the line voltage, is applied to the inputs of an operational amplifier A3, whose voltage output is therefore proportional to the current flowing in the subscriber loop. With such an arrangement the output, which represents the line current, is unaffected by longitudinal voltages and currents on the line.

Another operational amplifier A4 acts as a comparator as it subtracts the output of amplifier A3 from a reference voltage $V_R$ to produce the control voltage $V_c$ for the variable voltage source VVS. The gain of A3 and the magnitude of $V_R$ can be so chosen that the current fed to the line is the same as that which would be obtained from a 200+200 ohm 50 volt feed, or may be chosen to follow a different law as required.

An off-hook sensing signal can be derived by adding amplifier A5, which makes a comparison with another reference voltage $V_{R2}$, so that the correct on-hook/off-hook threshold may be detected. The dashed line rectangle M shows an alternative location for the multi-resistor monitoring network.

The circuit of FIG. 8 is very similar to that of FIG. 7, except that the voltage across the line—instead of the current in the line—is monitored by an operational amplifier A6. Thus the output of A6 is an analogue of the line voltage, and this is applied to one input of another operational amplifier A7 at which a reference voltage $V_R$ is added, with the result that the output of the variable voltage source VVS exceeds the voltage across the line by an amount sufficient to maintain the constant current source CCS in its active operational mode. This voltage $V_R$ is normally of the order of 2 to 4 volts.

The off-hook sensing function may be performed by the use of an additional comparator A8, which is similar to the comparator A5 of FIG. 7.

FIGS. 7 and 8 indicate the principle of controlling the variable voltage source, and other means may be used. Thus the appropriate controlling law could be computed in a microprocessor in an arrangement in which the line voltage or current conditions are monitored via a high impedance monitor and an analogue to digital converter. This would be especially useful if the microprocessor is needed in the line circuit for other functions which do not use all of its time.

I claim:

1. A line feeding arrangement for providing a direct current output for a telephone subscriber's instrument powered by a two wire line, comprising a circuit for monitoring the output voltage transmitted to the instrument, a variable voltage source, said monitoring circuit including a voltage comparator for comparing the output voltage against a reference voltage for controlling switching means in said variable voltage source to transmit voltage from said line during periods when the output voltage is less than the reference voltage and for preventing line voltage from reaching said output during periods when the output voltage exceeds the reference voltage, said variable voltage source including first means for storing energy for transmission to said instrument during said first-mentioned periods and further means for storing energy for transmission to said instrument during said second-mentioned periods.

2. An arrangement as claimed in claim 1, and in which said monitoring circuit consists of first and second low value resistors each included in one of the line wires, a connection from one end of the first resistor via third and fourth high value resistors to one end of the second resistor, a connection from the other end of the first resistor via fifth and sixth high value resistors to the other end of the second resistor, and connections from the junction of said third and fourth resistors and the junction of the fifth and sixth resistors to an amplifier in said voltage comparator whose output is thus representative of the line conditions.

3. An arrangement as claimed in claim 1, and in which the voltage comparator comprises an operational amplifier having its two inputs each connected to one of the line wires via a resistor, so that the output of the operational amplifier is proportional to the voltage across the line.

4. An arrangement as claimed in claim 1, and in which the voltage comparator comprises an operational amplifier to one input of which is connected the output of the monitoring circuit and to the other input of which is connected a reference voltage, the output of the comparator forming the controlling input of the variable voltage source.

5. An arrangement as claimed in 1, in which the switching means of the variable voltage source includes a transistor which is transformer coupled to a diode capacitor combination, and control means for applying a pulse train to the transistor to switch it on or off, in which each pulse switches the transistor on for the duration of the pulse so that a pulse passes via the transformer and the diode to charge the capacitor, the level of the charge on the capacitor determining the output voltage of the voltage source, and in which to vary said output voltage the pulse rate and/or the pulse width is or are varied under control of the output of the comparator.

6. An arrangement as claimed in claim 1 and in which the output of the variable voltage source is applied to the line wires.

7. An arrangement as claimed in claim 1, and in which the output of the variable voltage source is applied to the input of a constant current source so that the dissipation within the constant current source is minimized because the variable voltage source only generates sufficient voltage to maintain the constant current source in its active mode of operation.

8. A line feeding arrangement for a telephone subscriber's line, which includes:
   (a) a monitoring circuit connected to the line for monitoring the direct current flowing in the line, which monitoring circuit includes first and second low-value resistors each included in one of the line wires, a connection from one end of the first resistor via third and fourth high value resistors to one end of the second resistor, a connection from the other end of the first resistor via fifth and sixth high value resistors to the other end of the second resistor, and connections each via a further resistor from the junction of said third and fourth resistors and the junction of the fifth and sixth resistor to the two inputs of an operational amplifier whose output is thus proportional to the line current;
   (b) comparison means formed by a second operational amplifier having a first input to which the output of the monitoring means is applied and a second input to which a reference voltage is applied, the second operational amplifier having an output on which appears an analogue electrical condition whose value varies in accordance with the relation between the output of the monitoring means and the reference voltage,
   (c) a variable voltage source to which extend control connections from the comparison means, the variable voltage source including a transistor whose collector output is coupled by a transformer to a diode-capacitor combination, and control means for applying a pulse train to the transistor to switch it on or off, each pulse of the said train switching the transistor on for the duration of that pulse so that a pulse passes via transformer and the diode to charge the capacitor, the level of the charge on the capacitor determining the output voltage of the voltage source, wherein the analogue electrical condition from the output of the comparison means controls the application of pulses to the transistor; and
   (d) connections from the voltage source to the line over which the voltage source applies a direct voltage to the line.

9. An arrangement as claimed in claim 8, and which includes a third operational amplifier having a first input to which one of the inputs of the first operational amplifier is connected, and a second input to which a reference voltage is applied, such that the output of the third operational amplifier is a voltage whose value indicates whether the handset at the remote end of the line is on-hook or off hook.

10. A line feeding arrangement for a telephone subscriber's line, which includes:
   (a) a monitoring circuit connected to the line for monitoring the direct voltage between the two conductors of that line which monitoring circuit includes a first resistor connected from one wire of the line to a first input to an operational amplifier and a second resistor connected from the other wire of the line to a second input to the operational amplifier, such that the output of the operational amplifier is a voltage whose value is representative of the voltage between the two wires of the line,
   (b) comparison means formed by a second operational amplifier having a first input to which the output of the monitoring means is applied and a second input to which a reference voltage is applied, the second operational amplifier having an output on which appears an analogue electrical condition whose value varies in accordance with the relation between the output of the monitoring means and the reference voltage,
   (c) a variable voltage source to which control connections extend from the output of the comparison means so that the voltage source is caused to generate a direct voltage output whose value is dependent on the relation between the output of the monitoring means and the reference voltage;
   (d) a constant current source to which the output of the variable voltage source is applied to control the current generated thereby; and
   (e) connections from the constant current source via which the current generated thereby is applied to the line.

* * * * *